Figure 1:
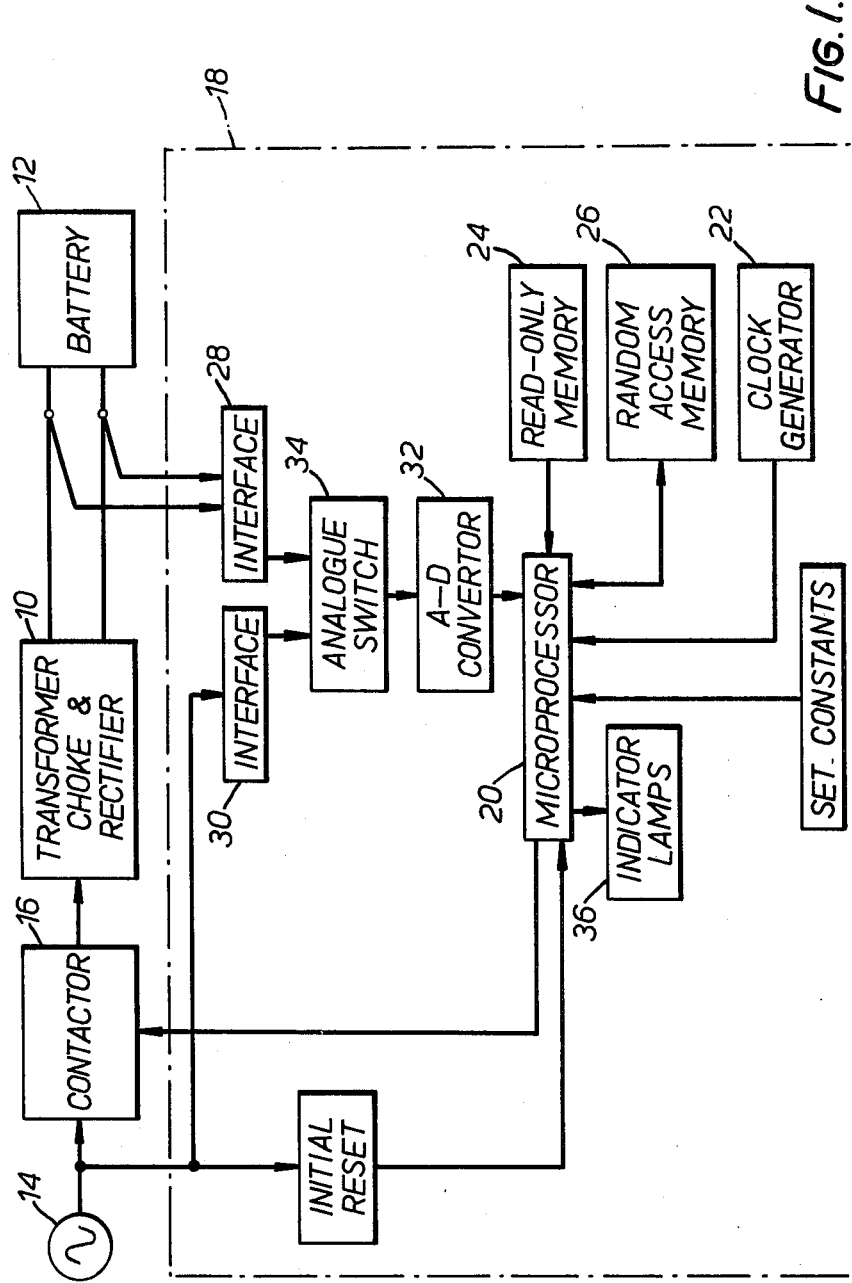

United States Patent [19]

Nicholls

[11] 4,191,918
[45] Mar. 4, 1980

[54] AUTOMATIC ELECTRIC BATTERY CHARGING APPARATUS

[75] Inventor: Anthony T. Nicholls, Eccles, England

[73] Assignee: Chloride Group Limited, London, England

[21] Appl. No.: 839,451

[22] Filed: Oct. 5, 1977

[30] Foreign Application Priority Data

Aug. 24, 1977 [GB] United Kingdom ............... 35493/77

[51] Int. Cl.$^2$ ............................................. H02J 7/04
[52] U.S. Cl. ........................................ 320/23; 320/37; 320/39
[58] Field of Search .................... 320/20, 22, 23, 39, 320/40, 37, 38

[56] References Cited

U.S. PATENT DOCUMENTS

| 3,794,905 | 2/1974 | Long | 320/20 |
| 3,979,658 | 9/1976 | Foster | 320/39 X |

Primary Examiner—Robert J. Hickey
Attorney, Agent, or Firm—Oblon, Fisher, Spivak, McClelland & Maier

[57] ABSTRACT

An automatic electric battery charger which detects when the battery is fully charged by monitoring the rate of rise of battery voltage; when the rate of rise falls below a predetermined value, the charge is terminated. The rate of rise of voltage is detected by comparing an unprocessed battery voltage signal with a signal which follows the battery voltage signal with an exponential lag having a time constant of about 45 minutes. With a low rate of rise of voltage, such as occurs when the battery approaches the fully charged state, the lagging signal will tend to catch up with the unprocessed signal, and when the difference falls below 11 mV per cell, the charged is terminated.

In the preferred embodiment, the signal processing is digitally implemented, using a microprocessor.

19 Claims, 2 Drawing Figures

AUTOMATIC ELECTRIC BATTERY CHARGING APPARATUS

This invention relates to automatic electric battery charging apparatus and is concerned with means for automatically terminating a charge (or substantially reducing the average charging current) when the battery is fully charged. More particularly, it is concerned with such terminating means which monitor a control signal which is dependent on the battery voltage while on charge, and terminate the charge (or reduce the average current) when the rate of change of the control signal falls below a predetermined value. Such terminating means is particularly, although not exclusively, applicable to charging apparatus which incorporates electrical ballast to give a taper charge characteristic, that is to say, a characteristic in which the charging current falls substantially with a rise in battery voltage.

According to one aspect of the invention, automatic electric battery charging apparatus is arranged to provide a control signal which follows variations in battery voltage comparatively rapidly, and a delayed signal which follows variations in battery voltage comparatively slowly, and is arranged to monitor the control and delayed signals and to terminate the charge (or to reduce substantially the average charging current) when the difference between the control and delayed signals, or a signal which follows this difference comparatively rapidly, falls below a predetermined value.

For example, the control signal may follow the battery voltage substantially instantaneously; alternatively, it may follow the battery voltage with an exponential lag having a time constant of, say, two minutes. The delayed signal may, for example, follow the battery voltage with an exponential lag having a time constant of, say, 45 minutes. It will be appreciated that, in comparison with a time constant of 45 minutes, it makes little difference whether the time constant for the control signal is zero or two minutes. If the apparatus is arranged to monitor a signal which follows the said difference between the control and delayed signals, rather than monitoring the difference itself, the monitored signal may follow the difference with an exponential lag having a time constant of, say, two minutes. This has much the same effect as if the control signal follows the battery voltage with a similar lag; in either case, the effect is to smooth out short-term fluctuations in battery voltage.

In one form of the invention, the battery charging means includes: means which are arranged to derive a direct charging current from an a.c. supply and which include impedance to give a taper charge characteristic, whereby the charging current falls substantially with rise of battery voltage; means arranged repeatedly to subtract the delayed signal from the control signal to derive an error signal; means arranged repeatedly to adjust the delayed signal by a small amount dependent on the error signal in a direction to bring the delayed signal closer to the control signal; and means arranged to terminate the charge (or substantially to reduce the average charging current) when the error signal, or a signal which follows the error signal comparatively rapidly, falls below the said predetermined value.

In operation, if the battery voltage is rising steadily, the control and delayed signals will also both be rising steadily, but will lag behind the battery voltage by the amount of the rise which ocurs during a period equal to their respective time constants. Thus, the difference between the control and delayed signals (the error signal) will give a measure of the rate at which the battery voltage is rising, and can be used to control termination of the charge (or the transition to the next phase of the charge).

One criterion for termination of the charge, where lead-acid batteries are concerned, is that the rate of rise of cell voltage falls below 11 mV in 45 minutes. Thus, assuming that the delayed signal follows the battery voltage with an exponential lag having a time constant of 45 minutes, the charge will be terminated when the error signal falls below 11 mV per cell.

If the battery voltage is rising, but in a non-linear manner, the difference between the control and delayed signals will not be representative of the rate of rise of cell voltage at any particular instant, but will, in effect, be a weighted average of the rate of rise of cell voltage during the previous parts of the charge, with the greatest weight being given to the rate of rise at the immediately preceding moment, and progressively less weight being given to earlier rates of rise, in accordance with a decaying exponential curve having a time constant of, in the example given above, 45 minutes.

The invention avoids a dilemma which arises with battery chargers which monitor the rate of rise of battery voltage by measuring the battery voltage at two moments which are spaced in time, and comparing the two measured values: if the interval between the measurements is short, the rise in voltage during this interval will be very small, and the charger will be easily upset by slight spurious changes in voltage, while if the interval between measurements is long, for example 45 minutes, the battery may be overcharged if the second measurement is made just before the battery reaches a fully charged condition, since the charge will not then be terminated until a further comparison is made, and this will be 45 minutes later, or even longer if a completely new pair of measurements are compared.

In effect, chargers which measure the battery voltage only at 45 minute intervals may be considered to derive a signal which is an average, with equal weighting, of the rate of rise of battery voltage during the preceding interval. This signal is then discarded, in one step. In contrast, a charger according to the present invention in effect discards the rate of rise values gradually, by gradually reducing the weight which is given to the rate of rise of battery voltage at a particular moment.

Thus, according to a second aspect, the invention may be regarded as providing automatic electric battery charging apparatus which is arranged to monitor a control signal which follows variations in battery voltage, and to provide a rate of voltage rise signal which is equal to a weighted average of the rate of rise of the control signal during a preceding part of the charge, the weighting factor being greatest for the most recent rise of the control signal and progressively less for earlier rises, and the apparatus also being arranged to terminate the charge (or to reduce substantially the average charging current) when the rate of voltage rise signal, or a signal which follows the rate of voltage rise signal, falls below a predetermined value.

In principle, the control and delayed signals required in a charger according to the first aspect may be generated by analogue, techniques, but in practice it may be difficult to achieve a time constant of 45 minutes in an analogue circuit. In a preferred embodiment, therefore, the control and delayed signals are digital signals, and the charger incorporates a digital computer programmed to perform the necessary calculations, the computer being fed with a battery voltage signal through an analogue-to-digital converter. Preferably the computer is a microprocessor, having its program stored in a read-only memory. The same program may be used for a whole range of chargers, and in this case, constants which are different for different chargers do not form part of the program, but are loaded into the computer from a source within the charger, as one of the first steps of the program. Such constants may include the number of cells in the batteries for which the charger is intended, the time constant or constants for the exponential lag or lags, and the predetermined value of the difference between the control and delayed signals at which charging is to be terminated.

Because the delayed signal has to be set to some arbitrary value at the beginning of the charge, some time may elapse before it settles down to a value which can be used to control the charge. The charger may therefore be arranged to ignore this signal until a predetermined time has elapsed. This time may be loaded into the computer as a further constant.

Since the battery voltage will rise only slowly during the early stages of a charge, the charger may also be arranged to ignore the fact that the difference between the control and delayed signals is below the predetermined value until the battery voltage rises above 2.36 volts per cell (in the case of a lead-acid battery). This may be achieved by monitoring either the control signal or the delayed signal.

The computer may also be programmed to resume the charging current to provide an equalising, freshening or topping up charge if the battery is left connected to the charger for a predetermined interval after it has become fully charged and the charge has been switched off. In this case preferably the equalising time is also loaded into the computer as a constant at the beginning of the charge.

Commonly assigned U.S. Pat. No. 3,979,658 in the name of Foster describes automatic electric battery charging apparatus in which the termination of the charge is controlled by monitoring the rate of rise of a corrected signal which comprises the difference between a signal corresponding to battery voltage and a signal corresponding to the voltage of an alternating supply by which the charger is supplied. It will be appreciated that in a charger relying on monitoring the slow rate of rise of battery voltage as the battery approaches the fully charged condition spurious results are liable to occur due to variation of the voltage of the alternating current supply. If the A.C. supply voltage rises, the battery voltage will also rise even though the battery is fully charged, and its voltage would not have risen had the alternating current supply voltage remained constant. Thus, the charge will be continued when the battery is fully charged. Conversely if the alternating supply voltage falls the battery voltage may remain constant, when the battery is not yet fully charged and its voltage would have risen if the alternating supply voltage had remained constant. In this case, the charge may be terminated prematurely. Preferably, the charging apparatus according to the present invention also incorporates this feature; in this case, both the control and delayed signals would be derived from the corrected signal.

Figure 2:
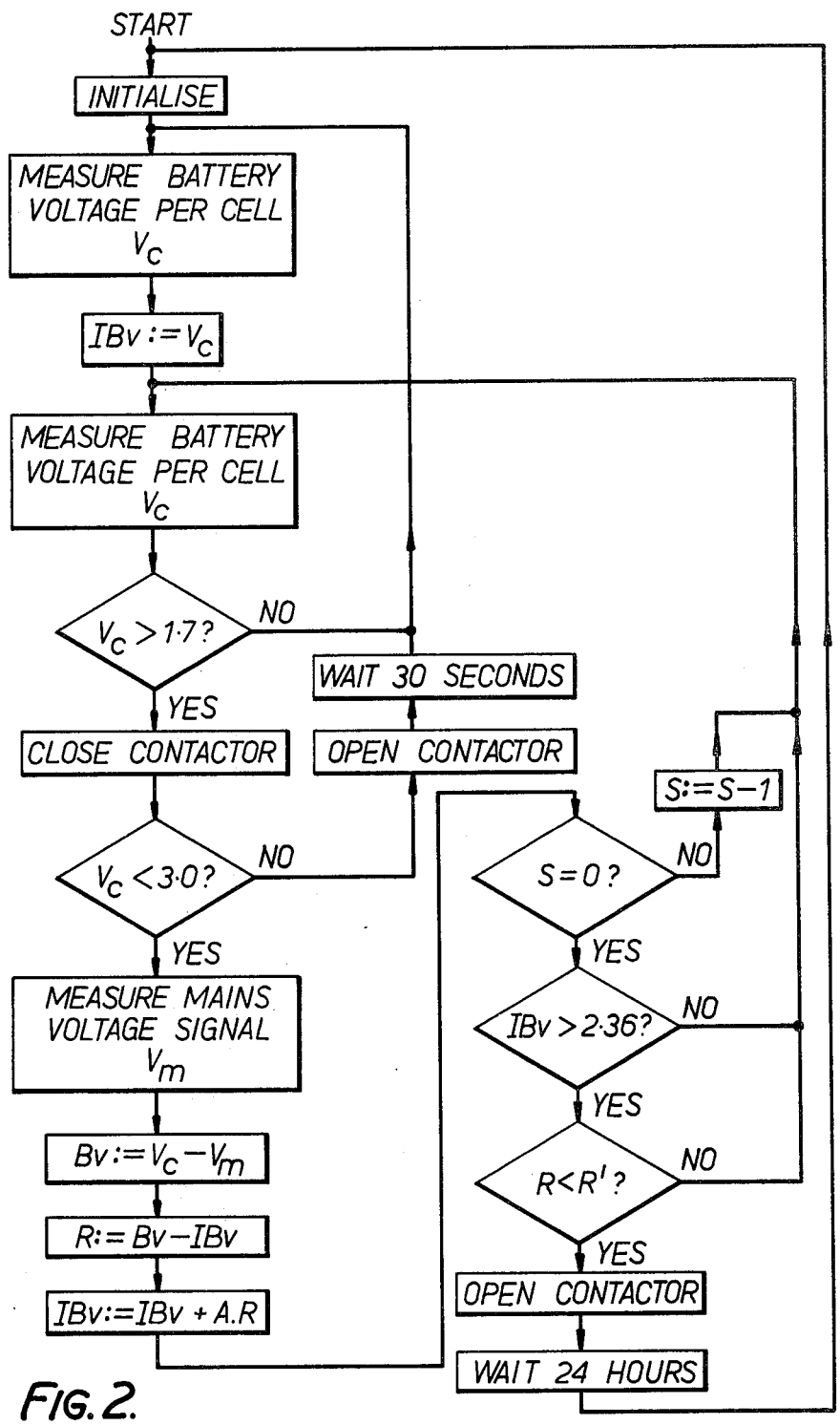

The invention may be carried into practice in various ways, but one specific charge controller embodying the invention will now be described by way of example, with reference to the accompanying drawings, of which:

FIG. 1 is a block diagram of a battery charger incorporating the charge controller; and FIG. 2 is a flow chart illustrating the operation of the charge controller.

The battery charger includes a transformer, choke and rectifier combination, indicated at 10 in FIG. 1, which are responsible for producing a direct charging current, for a battery 12, from an a.c. supply 14. The impedance of the choke means that the charger has a taper charging characteristic; that is, the charging current falls substantially as the battery voltage rises. The power supply to the transformer is controlled by a contactor 16, which is in turn controlled by the charge controller, which comprises the parts within the chain-dotted line 18.

The charge controller consists essentially of a microprocessor 20, with its associated clock generator 22, read-only program memory 24 and random access memory 26. The input signals to the microprocessor comprise a voltage which is proportional to the battery voltage, and is derived through an interface 28 comprising a potential divider, and a voltage which is proportional to the mains supply voltage, and is derived through an interface 30. These analogue voltage signals are fed to the microprocessor 20 through an analogue digital converter 32; an analogue switch 34 is provided between the signal sources and the input to the converter 32 to select whichever analogue signal is required at any moment. The microprocessor is also supplied with digital signals representing certain constants which are needed in the calculations; these signals may be supplied from switches, which provides for easy changing of the constants, or from a tagboard with appropriate hard-wired links, or from a simple form of read-only memory such as a diode matrix.

The principal output of the charge controller is a single signal which controls the operation of the contactor 16 in the primary circuit of the charger transformer. Other outputs are used to control lamps 36 indicating the present condition of the charge controller.

The microprocessor is programmed to operate in accordance with a program which is illustrated by FIG. 2, and comprises three main parts, namely, an initialisation stage, a charge commencing and monitoring stage, and an equalising interval timing stage. Thus, the initialisation stage is responsible for setting the various registers to zero, and loading the constants into the appropriate registers. The initialisation stage also measures the battery voltage signal, and uses this signal to set a further register to an initial value; the reason for this will be explained later.

The program then proceeds to the charge commencing and monitoring stage, which is basically a repetitive loop. The first operations in the loop check that the battery voltage per cell is between 1.7 and 3.0 volts per cell (both as a check to see whether a battery is connected, and as a check that the battery has the correct number of cells), and closing the charger contactor 16 if the voltage is within this range.

In the next part of the loop, the analogue switch 34 is changed over so that the mains supply voltage can be stored, in digital form. This signal is then subtracted from the battery voltage signal, which was stored during the earlier part of the loop. The resulting signal varies with the state of charge of the battery, but is not affected by fluctuations in mains supply voltage, and is referred to as the mains corrected battery voltage signal or Bv. Two further signals are derived from Bv by the program, in a manner which is described below. These signals are referred to, respectively, as the battery voltage error signal, or R, and the delayed battery voltage signal, or IBv. The delayed signal follows the mains corrected battery voltage signal with an exponential lag, so that the difference between these two signals IBv and Bv is, at least under steady conditions when Bv is rising linearly, a measure of the rate of rise of Bv; this difference is the error signal R, which for this reason can also be referred to as a rate of rise signal. The time constant of the exponential lag is, for example, 45 minutes.

The program then carries out two tests which ensure that the charge will not be terminated prematurely as a result of certain conditions which occur during the early stages of a charge. These tests are explained below. Assuming that these tests give the appropriate results, the program next compares the error or rate of rise signal R with a constant value R'. In the preferred embodiment, R' is 11 mV per cell; if the charge controller has provision for adjusting R', the range of adjustment could be from 0 to 50 mV per cell. If R>R', this indicates that the battery voltage is almost certainly still rising at more than 11 mV per cell in 45 minutes, and the program jumps back to the beginning of the loop. If R>R', this indicates that the rate of rise of battery voltage has fallen below 11 mV per cell in 45 minutes, and the charge is terminated.

The signals IBv and R are derived in the following manner. As mentioned above, the battery voltage signal is measured during the initialisation stage of the program; this is to allow the delayed battery voltage signal to be set to an initial value equal to the battery voltage signal. (This means that the value of the error signal R will not at first give an accurate indication of the way in which the battery voltage is rising; for this reason, the program is arranged to ignore the signals IBv and R until a period of, for example, 30 minutes has elapsed). After the mains corrected battery voltage signal Bv has been calculated, it is compared with the current value of the delayed signal IBv, and the signal R is set equal to the difference Bv−IBv. The delayed signal is then changed by a small amount which is proportional to the signal R, in such a sense as to bring it closer to the battery voltage signal Bv. In programming terms, this can be written:

$$IBv = IBv + A.R.$$

where A is a constant.

For as long as charging continues, the calculations described above will be carried out repetitively, with the program jumping back to the beginning of the loop (the operation of checking that the battery voltage is between 1.7 and 3.0 volts per cell) after each repetition. If the cycle time of this loop is dT, then the time constant of the exponential lag of the delayed signal IBv can be shown to be dT/A. In the preferred embodiment, the cycle time dT is one second. Thus, for a time constant of 45 minutes, A is $3.7037 \times 10^{-4}$; if the charge controller has provision for adjusting A, the range of adjustment may be, for example, $2.7778 \times 10^{-4}$ to $8.3333 \times 10^{-4}$, giving a time constant range from 20 minutes to 60 minutes.

In order to set the 30 minute period during which the signals IBv and R are ignored, the constants loaded into the registers at the beginning of the program include a settling time S, which represents the number of times that the loop described above must be traversed before 30 minutes has elapsed. After incrementing IBv as described above, S is tested to see whether it has reached zero; this is one of the tests, mentioned above, which are intended to prevent premature termination of the charge. If S is not equal to zero, S is decremented by one, and the program jumps back to the beginning of the loop. If S has reached zero, the program then tests the delayed battery voltage signal IBv to see whether it is greater than 2.36 volts per cell; this is the other of the two tests. If not, this indicates that the battery cannot yet be fully charged, and the program jumps back to the beginning of the loop. If IBv>2.36 volts per cell, this indicates that Bv has been above 2.36 volts per cell for at least 45 minutes, assuming that Bv is rising more or less steadily, and this means that the battery is approaching a fully charged condition.

After termination of the charge when R<R', the program then enters the equalising interval timing stage. This serves to restart the charge at intervals of, say, 24 hours, for as long as the battery is left connected. The charge is restarted by jumping back to the initialisation stage of the program.

What I claim as my invention and desire to secure by Letters Patent is:

1. Automatic electric battery charging apparatus, comprising means arranged to provide a control signal which follows variations in battery voltage comparatively rapidly, and a delayed signal which follows variations in battery voltage comparatively slowly, and means arranged to monitor the control and delayed signals and to reduce the average charging current when the difference between the control and delayed signals, or a signal which follows this difference comparatively rapidly, falls below a predetermined value.

2. Apparatus as claimed in claim 1 in which is so arranged that the control signal follows the battery voltage substantially instantaneously.

3. Apparatus as claimed in claim 1 which is so arranged that the control signal follows the battery voltage with an exponential lag having a short time constant.

4. Apparatus as claimed in claim 1 in which the short time constant is approximately two minutes.

5. Apparatus as claimed in claim 1, which is so arranged that the delayed signal follows the battery voltage with an exponential lag having a long time constant.

6. Apparatus as claimed in claim 5, in which the long time constant is approximately 45 minutes.

7. Apparatus as claimed in claim 1, in which the monitoring means is arragned to generate a derived signal which follows the said difference with an exponential lag having a short time constant, and to reduce the average charging current when the derived signal falls below a predetermined value.

8. Apparatus as claimed in claim 7 in which the short time constant, for the derived signal, is approximately two minutes.

9. Apparatus as claimed in claim 1, including: means which are arranged to derive a direct charging current from an a.c. supply, and which include impedance to give a taper charge characteristic, whereby the charging current falls substantially with rise of battery voltage; means arranged repeatedly to subtract the delayed signal from the control signal to derive an error signal;

means arranged repeatedly to adjust the delayed signal by a small amount dependent on the error signal in a direction to bring the delayed signal closer to the control signal; and means arranged to reduce the average charging current when the error signal, or a signal which follows the error signal comparatively rapidly, falls below the said predetermined value.

10. Apparatus as claimed in claim 1 which is adapted for charging lead-acid batteries, and which is so arranged that the average charging current is reduced when the said difference between the control and delayed signals falls below a value corresponding to a steady rise of voltage of approximately 15 mV per cell per hour.

11. Automatic electric battery charging apparatus comprising means for monitoring a control signal which follows variations in battery voltage, and for providing a rate of voltage rise signal which is equal to a weighted average of the rate of rise of the control signal during a preceding part of the charge, the weighting factor being greatest for the most recent rise of the control signal and progressively less for earlier rises, and means for reducing the average charging current when the rate of voltage rise signal, or a signal which follows the rate of voltage rise signal, falls below a predetermined value.

12. Apparatus as claimed in claim 1 which includes a digital computer, to which a battery voltage signal is supplied through an analogue-to-digital converter, the computer being programmed to calculate the values of the various signals, and to compare the appropriate signal with the said predetermined value, to ascertain whether the average charging current should be reduced.

13. Apparatus as claimed in claim 12 in which the computer is a microprocessor, having its program stored in a read-only memory.

14. Apparatus as claimed in claim 1 which is so arranged that the charge will not be terminated within less than a predetermined period from its commencement.

15. Apparatus as claimed in claim 1 which is so arranged that the charge will not be terminated unless a signal which follows the battery voltage has risen above a predetermined value.

16. Apparatus as claimed in claim 15 which is adapted for charging lead-acid batteries, and is so arranged that the charge will not be terminated unless a signal which follows the battery voltage has risen above a value corresponding to a battery voltage of approximately 2.36 volts per cell.

17. Apparatus as claimed in claim 1 which is arranged to provide a freshening charge at intervals if the battery is left connected to the charger for longer than a predetermined period after the main charge has been terminated.

18. Apparatus as claimed in claim 1 which is arranged to derive the control signal as the difference between signals corresponding, respectively, to battery voltage and to the voltage of the power supply to the charger.

19. Apparatus as claimed in claim 18 when appendant to claim 12, in which the signals corresponding to battery voltage and to power supply voltage are both supplied to the computer through the analogue-to-digital converter.

* * * * *